(12) United States Patent
Daum (10) Patent No.: US 6,968,471 B2
(45) Date of Patent: Nov. 22, 2005

(54) SYSTEM FOR ARBITRATING CLOCK SYNCHRONIZATION AMONG NETWORKED DEVICES

(75) Inventor: Wolfgang Daum, Erie, PA (US)

(73) Assignee: General Electric Company, Schenectady, NY (US)

( * ) Notice: Subject to any disclaimer, the term of this patent is extended or adjusted under 35 U.S.C. 154(b) by 277 days.

(21) Appl. No.: 09/754,419

(22) Filed: Jan. 5, 2001

(65) Prior Publication Data

US 2003/0105803 A1   Jun. 5, 2003

Related U.S. Application Data

(60) Provisional application No. 60/227,973, filed on Aug. 25, 2000.

(51) Int. Cl.[7] .............................. G06F 1/12; H04L 7/00
(52) U.S. Cl. ...................................................... 713/400
(58) Field of Search ........................................ 713/400

(56) References Cited

U.S. PATENT DOCUMENTS

| | | | | |
|---|---|---|---|---|
| 5,349,344 A | | 9/1994 | Head | |
| 5,428,645 A | * | 6/1995 | Dolev et al. | 375/354 |
| 5,559,550 A | * | 9/1996 | Mankovitz | 725/41 |
| 5,805,530 A | | 9/1998 | Youngberg | |
| 5,848,028 A | * | 12/1998 | Burklin | 368/46 |
| 5,929,771 A | * | 7/1999 | Gaskill | 340/7.54 |
| 5,995,846 A | * | 11/1999 | Jakobsen | 455/517 |
| 6,091,804 A | * | 7/2000 | Banerjee | 379/93.01 |
| 6,223,228 B1 | * | 4/2001 | Ryan et al. | 713/375 |
| 6,363,256 B1 | * | 3/2002 | Muller et al. | 455/462 |
| 6,686,848 B1 | * | 2/2004 | Morikawa | 340/825.22 |

FOREIGN PATENT DOCUMENTS

JP   60129688 A   *  7/1985  ............. G04G 5/00

* cited by examiner

*Primary Examiner*—Lynne H. Browne
*Assistant Examiner*—Eric Chang
(74) *Attorney, Agent, or Firm*—H. Neil Houser, Esq.; Armstrong Teasdale LLP (57) ABSTRACT

Electronic devices coupled together via a communications network having date and time functions which are synchronized using an arbitration scheme so that any device in the network may have its date and time set after the clock on any respective electronic device has been set.

12 Claims, 7 Drawing Sheets

SYSTEM FOR ARBITRATING CLOCK SYNCHRONIZATION AMONG NETWORKED DEVICES

CROSS REFERENCE TO RELATED APPLICATIONS

This application claims the benefit of U.S. provisional application No. 60/227,973, entitled, "Arbitrating Clock Synchronization System", filed on Aug. 25, 2000.

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights.

BACKGROUND OF THE INVENTION

This invention generally relates to a clock synchronization system and more particularly to an arbitrating clock synchronization process for electronic devices within a communications network.

U.S. Pat. No. 5,805,530, Youngberg, discloses a clock setting system based on a master-slave setting approach, where the master receives a reference clock signal and communicates it to slave modules such as major appliances, TVs, automobiles, phones etc. One limitation of this approach is that an master clock system is needed that then distributes the clock signal to all slave devices.

It would be desirable to have a clock synchronization scheme that eliminates the need for the master clock system to set all modules within a system based on the process wherein the last module that had its clock set communicates the data to all other devices coupled to the network as disclosed in Youngberg.

BRIEF SUMMARY OF THE INVENTION

The present invention comprises electronic devices coupled together via a communications network having date and time functions which are synchronized using an arbitration scheme so that any device in the network may have its date and time set after the clock on any respective electronic device has been set. In one exemplary embodiment the present invention is a system and method for updating the time of all of the electronic devices within a network comprising at least two electronic devices, wherein each electronic device has a time set feature capable of being set by a user. Each one of the electronic devices is further configured to communicate a set function to another networked electronic device after having received a set instruction, until all devices within the communications network have been set.

DETAILED DESCRIPTION OF THE INVENTION

The present invention relates to any appliance or electronic device within the range of networked electronic devices that employs a clock having a settable time and date, and that communicates this new setting to all other electronic devices. In this manner all other electronic devices are synchronized by relying on the user to set the clock just as users are now mechanically set the time and/or date. Since the user cannot set the time on more than one device at a time, the last device assumes the responsibility of the arbitrating master and communicates the new setting to all other devices on the communication network.

The communications network comprises a power line carrier such as X-10, ITRAN, INTELLON, CEBUS or other standard protocols, radio frequency methods based on frequency modulation, amplitude modulation, pulse width modulation or digital spread spectrum techniques in the electromagnetic wave band, intra-red communication methods or ultrasound communication methods.

Major appliances typically incorporate a clock function in the display. Examples known in the art include, modules manufactured and/or sold by the General Electric Company, such as, GE JT950SA double wall oven, the GE JBP79AB freestanding range and the GE JVM1190SY microwave oven. In these appliances, the clock has to be set each time the clocking signal is interrupted, such as when power interruption occurs, there is a brown-out condition, or when there is a change from standard to daylight savings time.

The clock programming sequence for the GE JVM1190SY microwave oven is accomplished by depressing a sequence of function and number keys, according to the steps indicated below:

Step 1. Depress clock key
Step 2. Depress number key to enter time multiple times
Step 3. Depress clock key to enter time
Step 4. Depress a.m./p.m. key to set am or p.m. and save the new time The micro controller, display and key entry system is known in the art. An exemplary embodiment is shown and described in U.S. Pat. No. 5,349,344 , Head et al, assigned to the assignee of the present invention and herein incorporated by reference.

If multiple appliances, each with its own clock are present in a household or multiple households, then it is desirable to set the clock only once and have all other clocks synchronized with the new setting.

Whereas U.S. Pat. No. 5,805,530, Youngberg, recites how the master clock can be obtained and broadcast from a master reference clock and master reference clock signal, such as the Colorado National Atomic Clock Reference, in case such a reference is available, it is desirable to have any appliance act as an arbitrating master clock where the time entered on any appliance is broadcast to any other appliance in range and sets the clock of those appliances to be synchronous to the arbitrated master appliance.

The appliances in the present invention can receive or transmit the time signal using any one of a plurality of communication means known in the art, such as CEBUS or EIA Standard 600, X10 www.x10.com, radio frequency communication standards, infra red communication standards or acoustic communication standards. Physical data exchange between appliances is provided by use power line carrier technologies, radio frequency technologies, infra red technologies as shown in EIA Standard 600, X10. To ensure that data is transmitted correctly, CRC error checking can be employed as described in the EIA 600standard, herein incorporated by reference.

Figure 1:
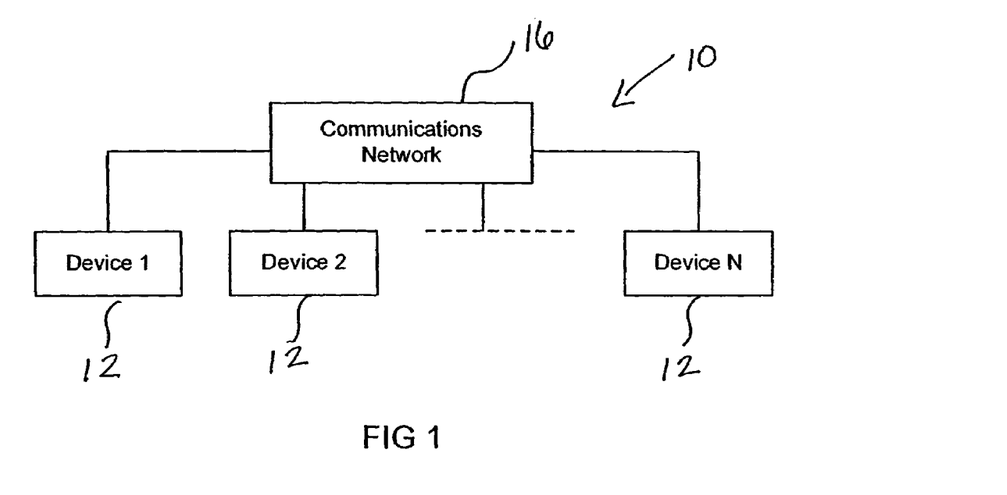
FIG. 1 is an block diagram illustration of the electronic devices within the communication network of the present invention.

FIG. 1, illustrates an exemplary embodiment of the clock synchronization system 10 of the present invention. Appliances 1, 2, . . . N are interconnected using a common communication network 16, such as CEBus, X10, or other as identified above. Each appliance incorporates a electronic device 12 also identified as a commercial appliance controller which is capable of performing the appliance control function.

Figure 2:
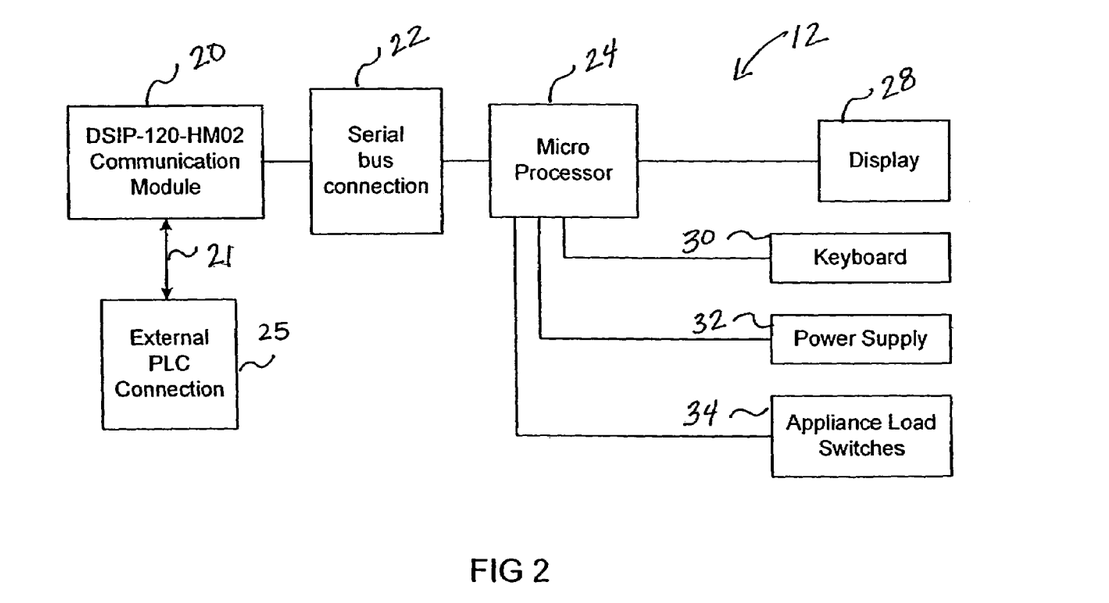
FIG. 2 is a block diagram illustrating an exemplary embodiment of the electronic components that comprise the electronic device of the present invention.

In an exemplary embodiment, as illustrated in FIG. 2, controller 12 comprises a micro-processor 24, a keypad 30 for data entry, a display 28 that is used for appliance control and clock functions, a power supply 32, a set of load switching devices 34 such as relays or triacs that regulate the power to appliance loads. In one exemplary embodiment controller 12 is a Hitachi H8-3644 micro-controller.

Additionally, a communication module 20 is added and electrically coupled to micro controller 12, such as one sold by DomoSys Corporation, model number DSIP-120-HM02 120V CEBUS™ communication module, herein incorporated by referenced. Alternate communication modules based on other known communication standards such as X10, ITRAN, INTELLON, power line carrier systems, or radio frequency, or infra red, or acoustic data exchange protocols may also be utilized as communications module 20.

Communications module 20 provides communication functions such as authentication, modulation, demodulation, physical layer encoding and error checking function as referenced in protocol standard EIA 600.

In one exemplary embodiment communication module 20 interfaces with microprocessor 24 through a serial connection 22 and interfaces via a microprocessor serial communication port 21 and across an internal/external barrier 25 with another device. In an alternate exemplary embodiment communication module 20 interfaces to microprocessor 24 through a parallel connection and to a microprocessor parallel bus.

In an exemplary embodiment micro-processor 24 executed a program on a continuos basis that is used for appliance control and clock functions as known in the art and implemented in the GE JVM1190SY microwave oven.

Figure 3:
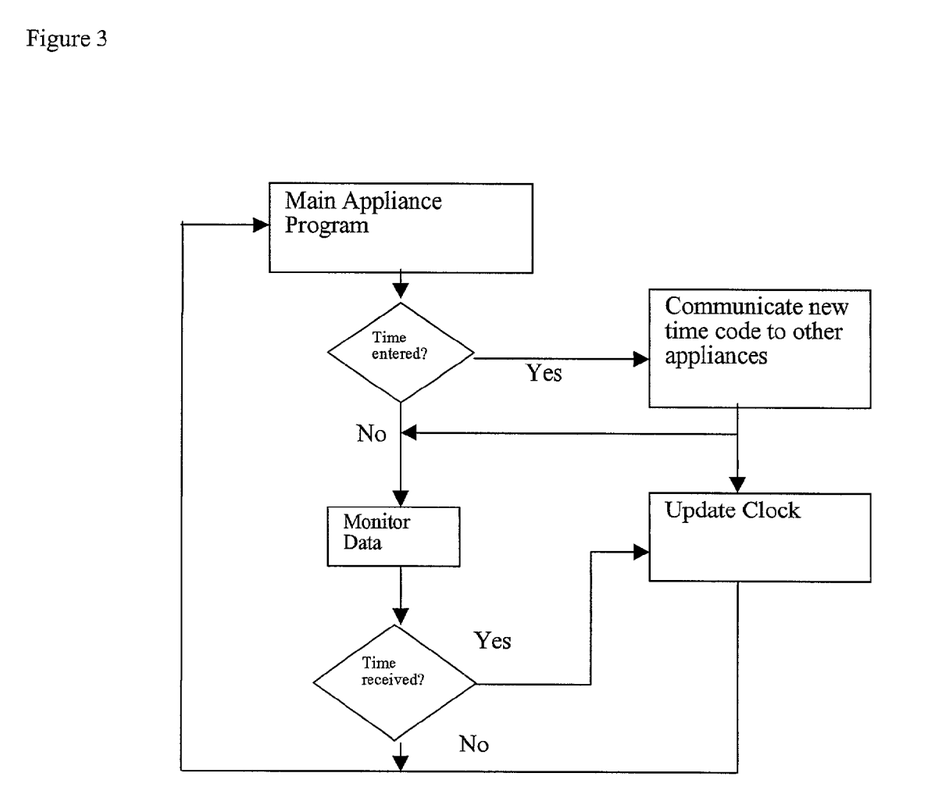
FIG. 3 is a block diagram illustrating the process by which each electronic device of the present invention is synchronized.

The program includes a set of instruction blocks that perform the steps illustrated in the process flow diagram of FIG. 3 as described in the following steps. First, if time has been set, then communicate the new time to all other appliances, steps 54 and 56. Next, monitor data from communication module 20, step 57. Finally, if a new time data package is received, then update clock display 28, steps 58 and 60.

Figure 4:
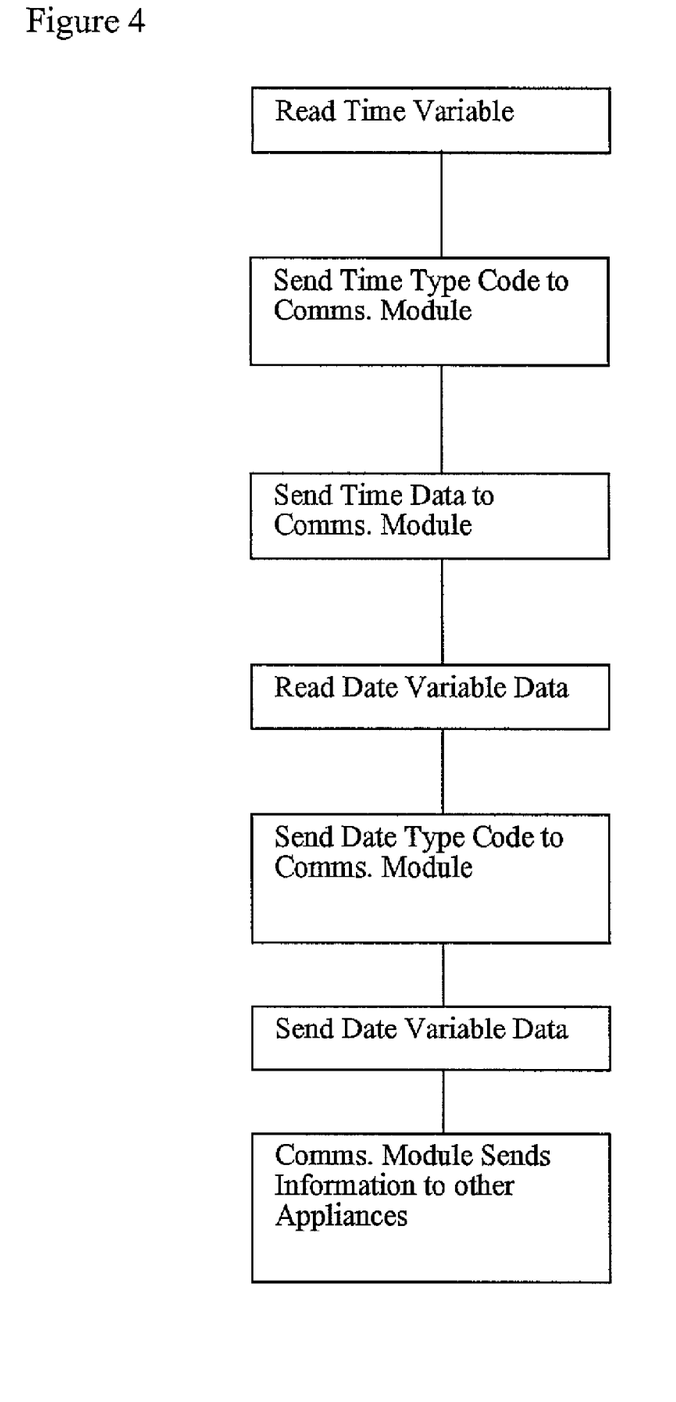
FIG. 4 is a process flow diagram illustrating the time code transmission process of the present invention.
Figure 5:
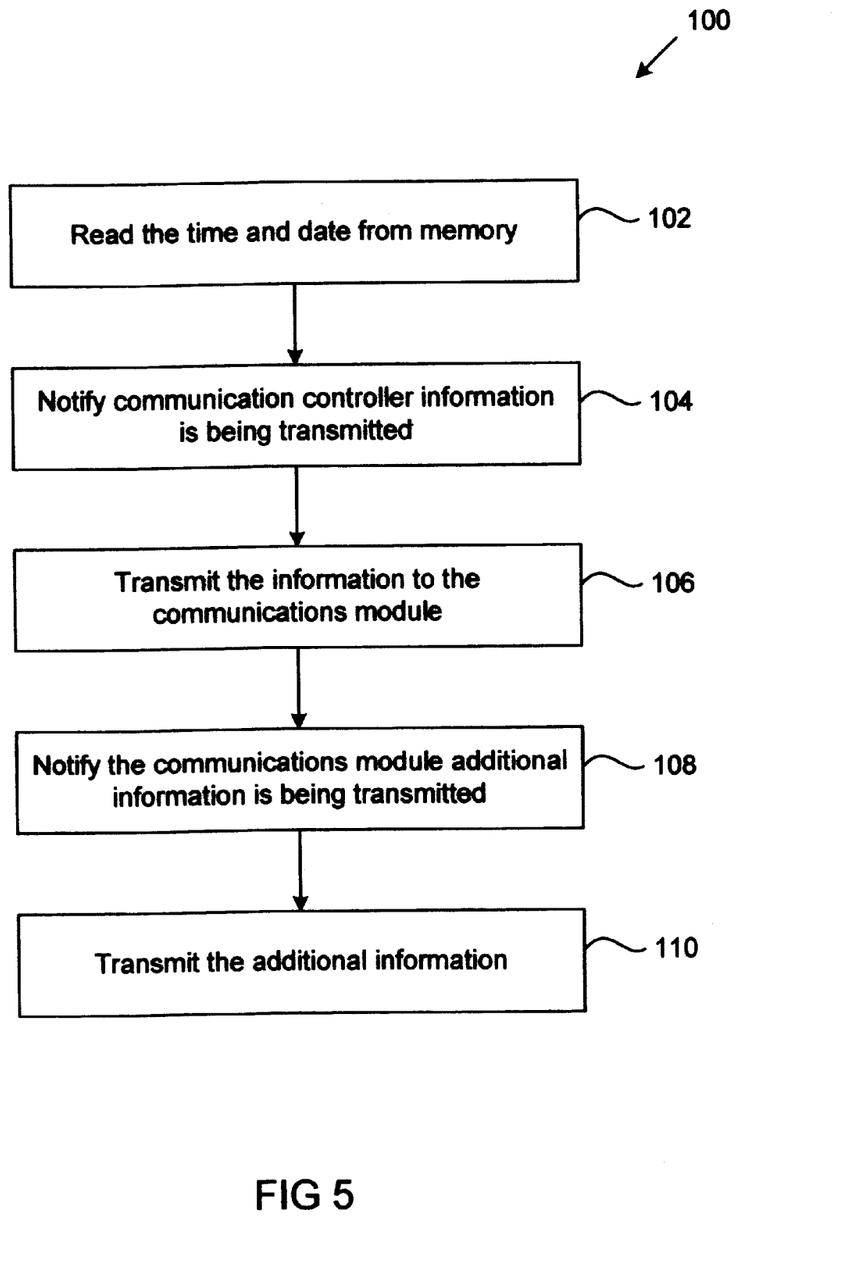
FIG. 5 is a process flow diagram of an alternative arbitrating scheme of the present invention.

A more detailed sequence of program steps for the initiation of time code transmission is given in FIGS. 4 and 5. In one exemplary embodiment subroutine 62 is added to the internal clock update routine that incorporates the programming steps below. In an alternate exemplary embodiment the programming steps are added to the clock update code without executing a subroutine.

As shown in FIG. 4, subroutine 62 includes reading 64 a time variable, sending 66 time type code to communication module 20, sending 68 time data to communication module 20, reading 70 date variable data, sending 72 date type code to communication module 20, sending 74 date variable data, and sending 76 information from communication module 20 to other appliances. The time and date information is stored in local memory 82 in the main processor such as the Hitachi H8-3644. In an alternate exemplary embodiment the time and date information is stored in local memory outside micro processor 24, such as an EEPROM, part number Microchip 93C66, which then interfaces to microprocessor 24 across internal/external barrier 25. In yet another alternative embodiment, a programmable logic controller device 80 interfaces with communication module 20 via internal/external barrier 25 and microprocessor serial communication port 21. In an alternative embodiment, as illustrated in FIG. 5, routine 100 is adapted to read the time information as a block consisting of hours, minutes and seconds, step 102. Microprocessor 24 sends a signal to communication module 20 indicating that time information is being transmitted, step 104. Microprocessor 24 transmits the time information to communication module 20, step 106. Microprocessor 24 notifies communication module 20 that date information is being transmitted, step 108. Microprocessor 24 then transmits date information to communication module 20, step 110.

It is understood that the data exchange between communication module 20 and microprocessor 24 can be accomplished on a broadcast approach with out acknowledge or with acknowledge. It is also understood that a data fetching and transmission sequence can be used such as notifying communication module 20 that type time or date information is to follow followed by fetching the data and then transmitting it. Communication module 20 in turn sends the data to the other appliances relying on the specific communication implementation standard used, such as CEBUS, X10, etc, which may include their own handshaking and data acknowledgements. It is understood that different sequences of transmitting the data from microprocessor 24 to the communication module 20 can be used, such as transmitting date information first followed by time information.

In an alternate exemplary embodiment a combined date and time code may be sent to communication controller 12 where communication controller 12 only expects time and/or date information thus making it unnecessary to alert communication controller 12 that time or date type information is to follow. In this manner steps 104, 108, and 110 of sequence 100 may be eliminated.

In an alternate exemplary embodiment the type and time or date information are sent as a coded message where part of the single message identifies the subsequent data as being of type time and/or date. Such coding methods are known in the art and used by RISC type micro processors such as the Microchip PIC16C74 micro processor.

Figure 6:
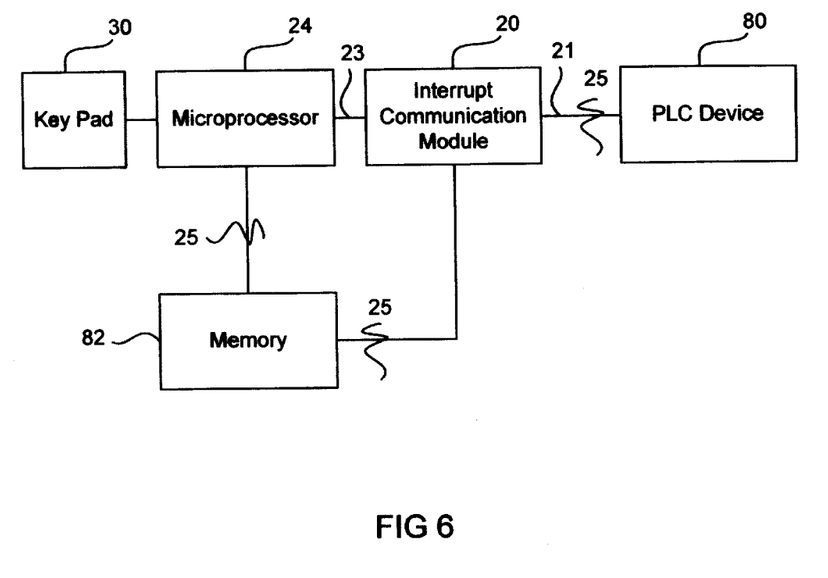
FIG. 6 is a block diagram illustrating further details of the electronic device of the present invention.
Figure 7:
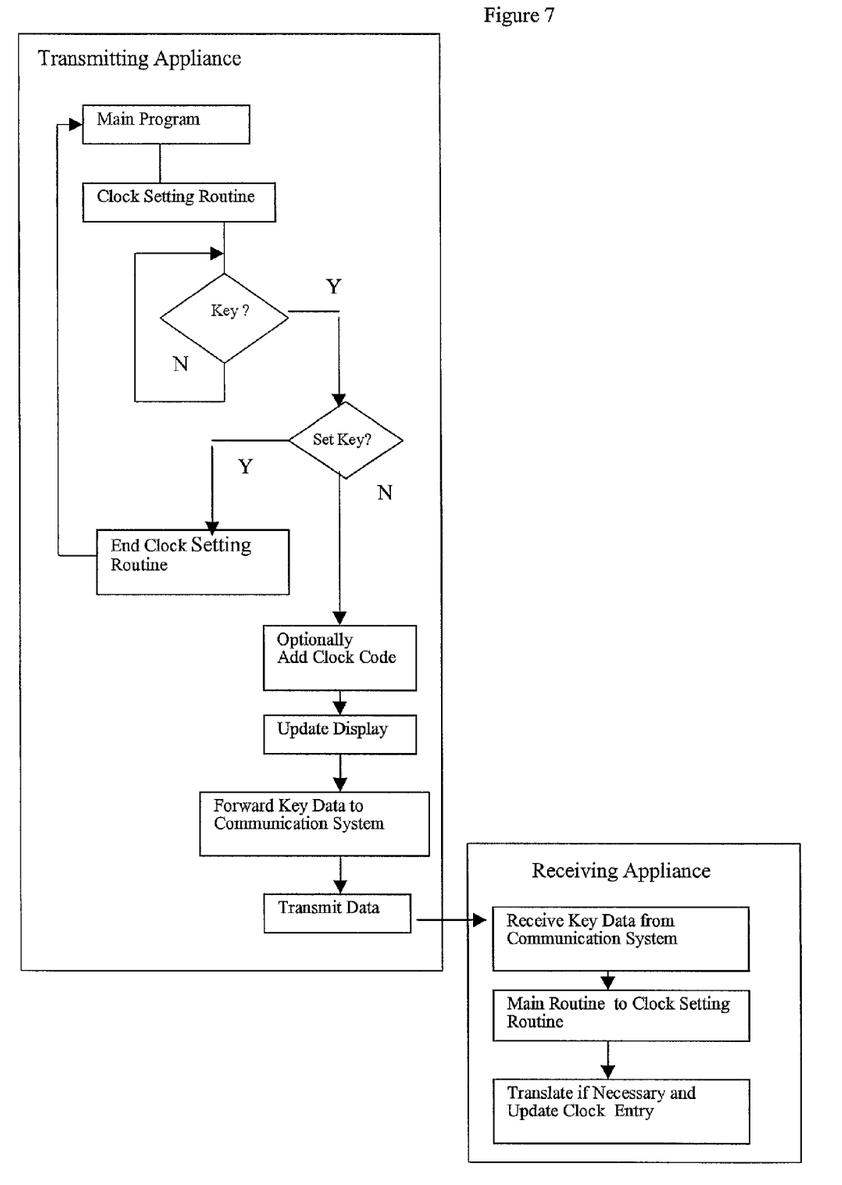
FIG. 7 is a process flow diagram illustrating one aspect of the time code initiation and transmission process of the present invention.

An exemplary implementation of process 50 (FIG. 3) that received the data from communication module 20 and forwards it to a routine for time and date setting is described below, and is illustrated in FIGS. 6 and 7. It is understood that process 50 can be implemented by a subroutine call of as part of the main program 122 (FIG. 7). In an exemplary embodiment the data transfer from communication module 20 is initiated by communication module 20 by use of an interrupt to the main micro processor 24. In one example, the interrupt is initiated on reset of electronic device 12, which may include power up reset. After receipt of the time or date information from another appliance, communication module 20 sends an interrupt signal 23 to microprocessor 24. Microprocessor 24 interrupts normal operation and services the interrupt. Microprocessor 24 reads the date or time code variable and writes it to the appropriate clock variable memory location. Microprocessor 24 then continues to execute the interrupted program. It is understood that the data can be presented as shown above by type followed by type data content as specific expected sequences of time and/or date, or by a combined type and data content. In an alternate exemplary embodiment the microprocessor algorithm continuously queries communication module 20 for the presence of new data as part of the main control loop and then writes the new data to the relevant time and/or date variable.

In a further alternate exemplary embodiment the data transfer between microprocessor 24 and communication module 20 transmitting the new time and/or date to other appliances is done where the last key data is forwarded to the communication controller every time a key is pressed on key pad 30. The data is then forwarded to other appliances via communications module 20 which in turn interpret the keys and set time and/or date.

Figure 8:
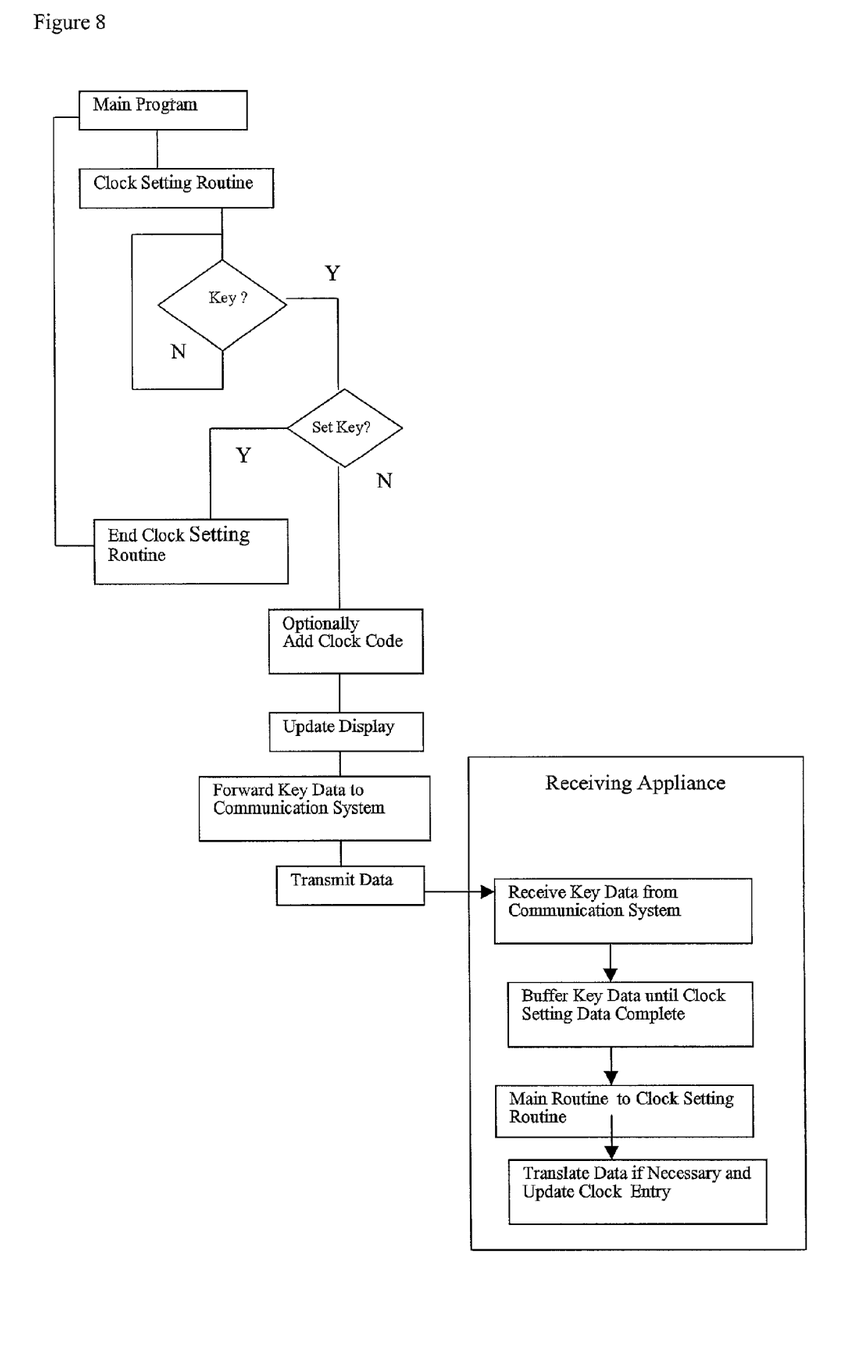
FIG. 8 is a process flow diagram illustrating an additional aspect of the time code initiation and transmission process of the present invention.

FIG. 7 further illustrates one exemplary embodiment of the method of transmitting the clock and date status upon operation of the set keys during a clock setting process. First, the clock setting routine 124 is entered from a main program 122 as part of the normal operation of the transmitting electronic device 12 or transmitting appliance. When a clock routine transition key has been activated, step 126, the clock setting routine determines if the clock setting routine should be ended, step 128, if so main program 122 is reinitiated. Otherwise, the sequence of steps that transmit the time and date codes are carried out. First, the time and/or date code is acquired; step 132, next the display is updated, step 134; next the code is forwarded to the communications module, step 136; then communications module 20 transmits the code over bus 21 to external devices 12. The above process is repeated until the clock setting function has been completed. It is understood that error handling and retransmission is not covered in this disclosure and is part of techniques known in the art, such as the CEBUS protocol. Once a respective external device 12 or receiving appliance gets the code, step 140, it initiates the clock setting routine, step 142. Then the code is optionally translated if necessary and the time and date function is updated, step 144. It is understood that clock codes may also be sequentially captured in an intermediate memory buffer until all of the clock codes are transmitted, step 152 (FIG. 8). Then the clock setting subroutine is subsequently entered and the steps carried out to update the clock, step 142. In an alternate exemplary embodiment just the key code is sent to communication module 20. Communication module 20 then transmits the clock setting code (when used) and key code to other appliances.

In one exemplary embodiment the time and/or date code is used by the receiving appliance without translation and the clock is updated. This is used where the key sequence and function is identical between appliance clock functions. In an alternate exemplary embodiment key code translation may be utilized to map between different code or clock representations.

It is understood, that time and/or date code includes combinations of hours, minutes, seconds, fractions of seconds, a.m./p.m., day of week, date, month and year settings. It is further understood that the term appliance has been used in this specification to identify an exemplary electronic device, whereas the term electronic device may be substituted for the term appliance.

The present invention comprises electronic devices 12 coupled together via communications network 16 having date and time functions which are synchronized using an arbitration scheme so that any device in the network may have its date and time set after the clock on any respective electronic device 12 has been set.

It will be apparent to those skilled in the art that while the invention has been illustrated and described herein in accordance with the patent statutes, modifications and changes may be made in the disclosed embodiments without departing from the true spirit and scope of the invention. It is, therefore, to be understood that the appended claims are intended to cover all such modifications and changes as fall within the true spirit of the invention.

What is claimed is:

1. A system for updating a first set of information including a time and a date of one of a plurality of electronic devices within the system, the system comprising:
a communication network being coupled to each of said electronic devices within said network, wherein each of at least two of said electronic devices has a time and date set feature capable of being set by a user, wherein one of said at least two electronic devices is configured to communicate the up dated first set of information to any respective electronic device after having received a set instruction configured to automatically set a first clock within the one of said at least two electronic devices, wherein said first clock is automatically set when a change in the time occurs, the one of said at least two electronic devices is configured to communicate the updated first set of information until remaining of said electronic devices within the communications network have been set, and
a first communications module configured to interrupt a first program executed by a microprocessor within the remaining of said electronic devices, wherein said first program is separate from a second program configured to update a second clock within the remaining of said electronic devices when the updated first set of information is received by the remaining of said electronic devices.

2. The system as recited in claim 1, wherein said communications network comprises a second communications module which utilizes standard communications protocol to communicate the updated first set of information between said electronic devices within said communications network.

3. The system as recited in claim 2, wherein said communications network comprises a Programmable Logic Controller.

4. The system as recited in claim 1, wherein said time and date set feature is a time code.

5. The system as recited in claim 1, wherein said time and date feature is a date code.

6. The system as recited in claim 1 wherein said change in time comprises a change from a standard to a daylight savings time.

7. The system as recited claim 1 wherein said clock is automatically set when a brown-out condition occurs.

8. A system for updating a time and a date of one of a plurality of appliances within the system, the system comprising:
- a communications network being coupled to each of said appliances within said network, wherein each of at least two of said appliances has a time and date set feature capable of being set by a user, wherein any one of said at least two appliances is configured to communicate the updated time and date to remaining of said appliances within the network after having received a set instruction configured to automatically set a first clock within any one of said at least two appliances, wherein said clock is automatically set when a change in the time occurs; and
- a first communications module configured to interrupt a first program executed by a microprocessor within the remaining of said appliances, wherein said first program is separate from a second program configured to update a second clock within the remaining of said appliances when the updated time and date is received by the remaining of said appliances.

9. The system as recited in claim 8, wherein said communications network comprises a second communications module which utilizes standard communications protocol to communicate time and date set data between said appliances within said communications network.

10. The system as recited in claim 9, wherein said communications network comprises at least two Programmable Logic Controllers.

11. The system as recited in claim 8, wherein said time and date set feature is a time code.

12. The system as recited in claim 8, wherein said time and date feature is a date code.

* * * * *

UNITED STATES PATENT AND TRADEMARK OFFICE
CERTIFICATE OF CORRECTION

PATENT NO.      : 6,968,471 B2
APPLICATION NO. : 09/754419
DATED           : November 22, 2005
INVENTOR(S)     : Daum

It is certified that error appears in the above-identified patent and that said Letters Patent is hereby corrected as shown below:

In Claim 1, column 6, line 27, delete "communication" and insert therefor -- communications --.

In Claim 7, column 6, line 66, delete "recited claim" and insert therefor -- recited in claim--.

Signed and Sealed this

Sixth Day of February, 2007

JON W. DUDAS
*Director of the United States Patent and Trademark Office*